(No Model.)

C. B. CARPENTER.
WATCH CHAIN HOOK.

No. 297,498. Patented Apr. 22, 1884.

WITNESSES:
Jos. N. Rosenbaum.
Otto Risch.

INVENTOR
Charles B. Carpenter
BY Joepel & Raegener
ATTORNEYS.

United States Patent Office.

CHARLES B. CARPENTER, OF NORTH ATTLEBOROUGH, MASSACHUSETTS,
ASSIGNOR TO E. A. BLISS COMPANY, OF SAME PLACE.

WATCH-CHAIN HOOK.

SPECIFICATION forming part of Letters Patent No. 297,498, dated April 22, 1884.

Application filed September 18, 1883. (No model.)

*To all whom it may concern:*

Be it known that I, CHARLES B. CARPENTER, of North Attleborough, in the county of Bristol and State of Massachusetts, have invented certain new and useful Improvements in Watch-Chain Hooks, of which the following is a specification.

Watch-chain hooks made in the shape of spring-rings have been used heretofore; but they had the disadvantage that when applying them to the button-hole the spring-pressed closing portion had to be held in drawn-back position, whereby the insertion of the hook was rendered difficult and the spring-pressed portion liable to slip out of the ring-shaped portion of the hook and get detached therefrom.

The object of this invention is to furnish an improved watch-chain hook which is made in the shape of a ring that is capable of being readily opened, so as to form a hook which can be readily introduced into the button-hole, after which it is closed again, so as to form a ring.

The invention consists of a watch-chain hook composed of a short segmental piece, that is connected by a swivel-ring to the watch-chain, provided at one end with a sliding and spring-pressed locking-catch, and at the other end with a pivot-hook of nearly circular shape, that is locked by the spring-pressed catch to the socket-shaped end of the segmental piece.

Figure 1:
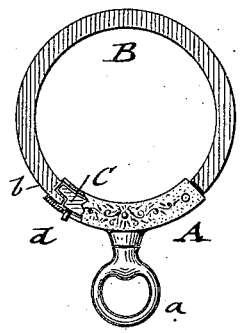
Figure 2:
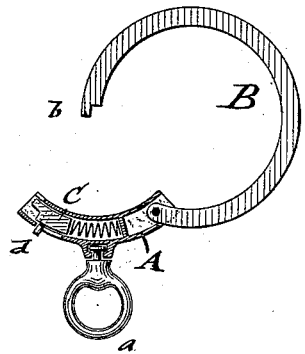
Figure 3:
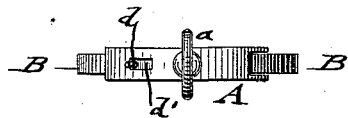

In the accompanying drawings, Figures 1 and 2 are side elevations, partly in section, of my improved watch-chain hook, showing the same, respectively, in closed and open position; and Fig. 3 is a bottom view of the same.

Similar letters of reference indicate corresponding parts.

Referring to the drawings, A represents a short hollow segmental piece, to which is swiveled a ring, *a*, by which the hook is connected to the watch-chain. To one end of the segmental piece A is pivoted a hook, B, of nearly circular shape, which, when closed, forms, with the piece A, one complete ring. The opposite end, *b*, of the hook B is recessed and adapted to enter into the opposite end of the segmental piece A, which is recessed at its inner edge to facilitate the passage of the end *b* of the hook B, so that it can be locked by a sliding and spring-actuated catch, C, which is arranged in the socket-shaped end of the segmental piece A. The recessed end *b* of the hook B presses against the spring-catch C and moves it back into the segment A until the hook end *b* clears the catch and arrives in the socket-shaped end of the segmental piece A. The spring-catch C is recessed at that end which engages the recessed end *b* of the hook B so that when the end *b* has cleared the spring-catch the latter is moved forward by its spring and locks the hook to the segment A. The spring-catch C is provided with a projecting stud, *d*, that is guided in a slot, *d'*, of the segmental piece A. By means of the stud the spring-catch C can be readily drawn back by the finger-nail and then the hook B opened. When the hook is opened, it remains in this position, and can be readily inserted into the button-hole like a common hook. It is closed simply by pressure on the hook and segment A, so that the connection of the hook with the segmental piece A and the spring-catch C is re-established.

As no parts are detachable, and as the spring-catch need not be held when the hook is inserted in the button-hole, a conveniently-operated and durable watch-chain hook is obtained. As the hook B is rigidly locked by the spring-catch, it cannot open accidentally, but holds the watch-chain securely in position. To detach the chain, the spring-catch is withdrawn and released from the hook, which is then opened and removed from the button-hole.

Having thus described my invention, I claim as new and desire to secure by Letters Patent—

1. The combination of a segmental piece, A, having a swivel-ring, *a*, a hook, B, pivoted to one end of the piece A, and provided with a recess, *b*, at the other end, a recessed and spring-cushioned catch, C, that is guided in the opposite end of the piece A, and provided with a stud, *d*, projecting through a slot, *d'*, of the piece A, substantially as set forth.

2. The combination of a hollow segmental piece, A, provided with a spring-catch, C, at one end, the spring-catch having a projecting stud, $d$, guided in a slot, $d'$, of the segment A, with a hook, B, pivoted to the other end of the piece A, the free end of which is recessed, so as to be locked by the spring-catch, substantially as set forth.

In testimony that I claim the foregoing as my invention, I have signed my name in presence of two subscribing witnesses.

CHARLES B. CARPENTER.

Witnesses:
FRED B. BYRAM,
J. E. CARPENTER.